July 9, 1963 J. V. MILLER 3,097,331
TWO SPEED MOTOR
Filed Sept. 19, 1960 3 Sheets-Sheet 1
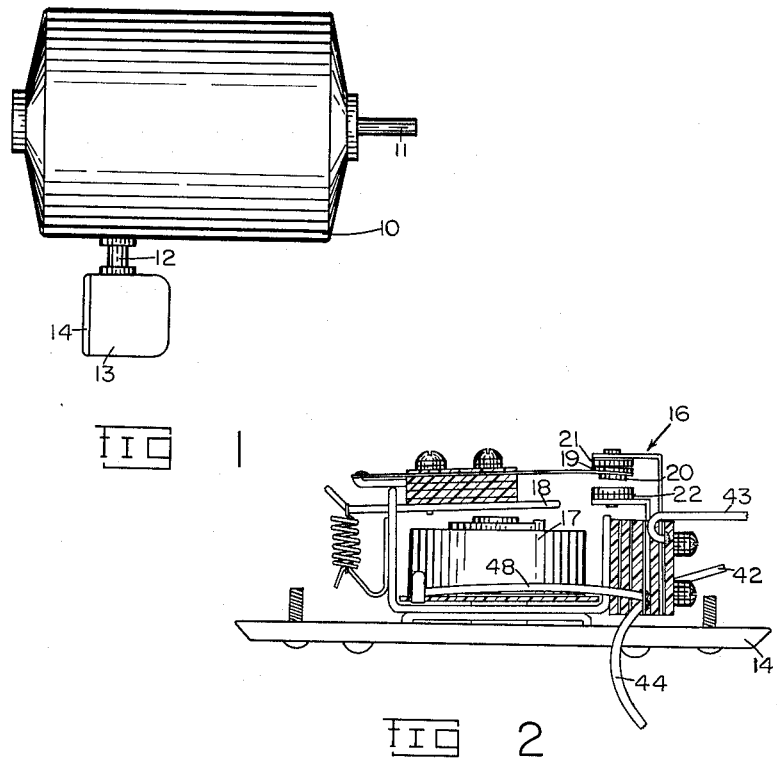
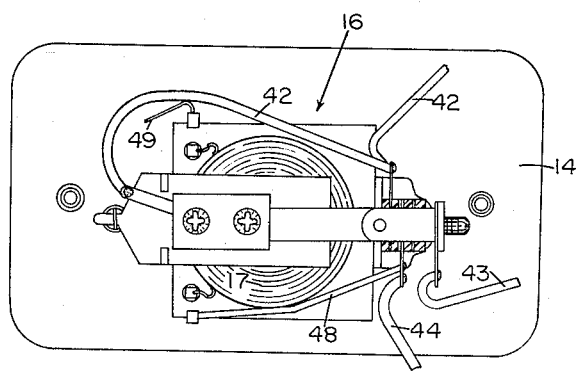
INVENTOR
J. VANCE MILLER
BY
John J. McLaughlin
ATTORNEY July 9, 1963  J. V. MILLER  3,097,331
TWO SPEED MOTOR
Filed Sept. 19, 1960  3 Sheets-Sheet 3

INVENTOR.
J. VANCE MILLER
BY John J. McLaughlin
ATTORNEY

_United States Patent Office_

3,097,331
Patented July 9, 1963

3,097,331
TWO SPEED MOTOR
J. Vance Miller, 2226 E. Amelia, Phoenix, Ariz.
Filed Sept. 19, 1960, Ser. No. 57,014
7 Claims. (Cl. 318—221)

My invention relates to an improved single phase, fractional horsepower, two speed motor and method of operating same by means of a regular single pole, single throw switch.

In many types of operations, either a single speed or two speed motor may be used; and at times it is desirable to shift from a single speed to a two speed type of operation. Illustrative of installations which may employ either single speed or two speed motors are evaporative coolers and attic fans. As a rule in this type of installation, the motor itself is relatively far removed from the switch which operates it; and since a single speed motor employs only a single pole switch with a single pair of wires running to it, and the two speed motor employs either two switches or a double throw switch with positions for high and low speeds, with a minimum of three wires running to it, it is necessary to rewire an installation in order to substitute a two speed motor for a single speed motor. This is usually a relatively costly operation, and also normally involves several trips to the installation site for public permit, preliminary installation, public inspection, and final installation; so that the change-over is normally unattractive both to the householder and to the contractor.

The principal object of my invention is the provision of an improved system adapted to utilize a two speed motor with a single pole switch to which only a single pair of wires is running.

Another object is to replace a single speed motor with a two speed motor in the types of installations identified without rewiring and with the use of the standard single pole switch previously installed.

Still another object of my invention is the provision of an improved two speed, single phase motor attached for operation by means of one single throw switch.

In carrying out my invention, I may provide an entirely new motor in which the added features of my invention are incorporated within the motor itself; or I may utilize the regular system of switches common to single phase, two speed motors with separate starting circuit, and incorporate therewith a holding circuit operated by a relay containing normally closed and normally open contact points, so that when the regular single pole line switch is closed and the motor started, the relay will be energized and hold the circuit on which the motor is first started. The system operates, however, so that when the regular line switch is momentarily disconnected and again closed while the motor is still turning and before the starting switch of the motor closes, the second circuit, operating at a speed different from the starting speed, will then be energized. The motor may thus be started to run at high speed and caused to drop to low speed when the regular line switch is momentarily opened; or alternatively, the motor may be started to run at low speed and then converted to high speed operation by momentarily opening the regular line switch.

A two speed motor with two running windings may, for example, have one four-pole winding to operate at 1,750 r.p.m., a six-pole winding to operate at 1,140 r.p.m., and a separate starting winding, which automatically de-energizes when the motor comes up to a predetermined speed. Such a two speed motor normally contains three self-contained switches; namely, a starting switch, which is closed when the motor is at rest but is opened when the motor comes up to a predetermined speed; a switch between the high and low speed terminals, closed when the motor is at rest and having the function of feeding only the starting winding and the high speed winding when a start is made; and finally a switch between the low speed terminal and the low speed winding, which is open during the starting phase, but which closes when the starting switch opens.

Using a single pole, double throw relay with a pair of normally closed contact points and a pair of normally open contact points which are closed on energization of the relay, a circuit is established such that when the line switch is closed, current flows through the regular starting switch of the motor, through the starting winding, and through the high speed running winding, and back through the normally closed relay contact points. The relay coil is connected to the common terminal of the motor and to either the high speed or low speed motor terminal, depending upon the specific speed response desired from the motor. On closing of the line switch, therefore, the relay coil is energized and closes the normally open relay contact points, at the same time opening the normally closed relay contact points. The relay, therefore, holds the circuit established at the time the line switch is closed. By momentarily opening the regular line switch, the relay is permitted to de-energize, thereby closing the normally closed contact points and opening the normally open contact points. The system may be established either to initially operate the motor at high or low speed; but however established, the initially established circuit will be held until momentary opening of the line switch, at which time the second running circuit will be established.

Other specific objects and features of my invention will be apparent with the following detailed description, taken with the following detailed drawings, wherein:

FIG. 1 is a plan view, partly schematic, showing a motor modified in accordance with the present invention;

FIG. 2 is a side elevation of a form of relay which may be employed, showing the several leads thereto;

FIG. 3 is a plan view of FIG. 2;

Figure 4:
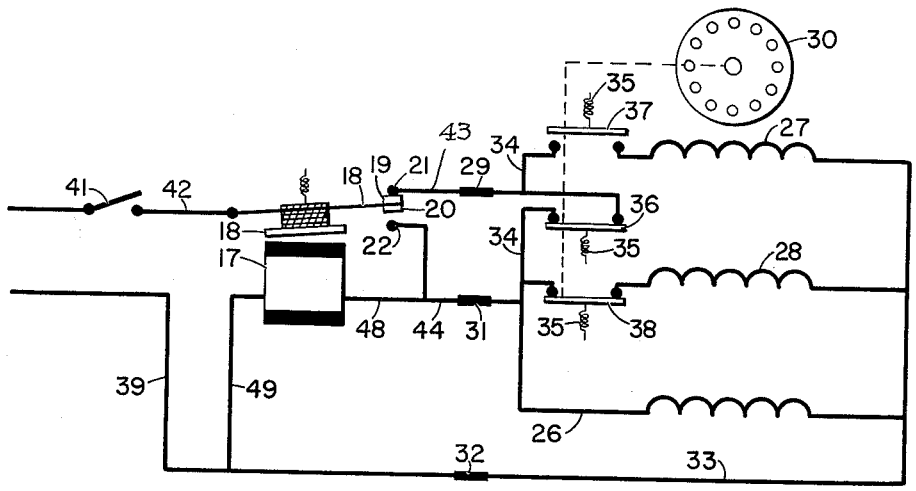
FIG. 4 is a schematic view showing the positions of the parts when the regular line switch is open and with the motor and relay contact points in the positions which they have at start.

Referring now to the drawings, FIG. 1 illustrates the manner in which a regular single phase, two speed, fractional horsepower motor may be modified in accordance with the present invention to operate at high or low speed in response to control by a single pole switch connected into a standard two wire circuit. In the drawings, the numeral 10 identifies the usual motor with projecting shaft 11 of standard type and wired in accordance with the schematic circuits shown in FIGS. 4 through 6. A short conduit 12 is threaded into the motor housing and carries a junction box 13 with a removable cover 14 carrying a standard type of relay assembly 16 functioning in the system as described hereinbelow. The relay 16 may be of a common type, having a coil 17, an armature 18 having contact points 19 and 20, a stationary contact point 21, normally engaged by movable contact point 19 when the relay coil is de-energized, and a contact point 22, which engaged by contact point 20 when the relay coil is energized.

Figure 5:
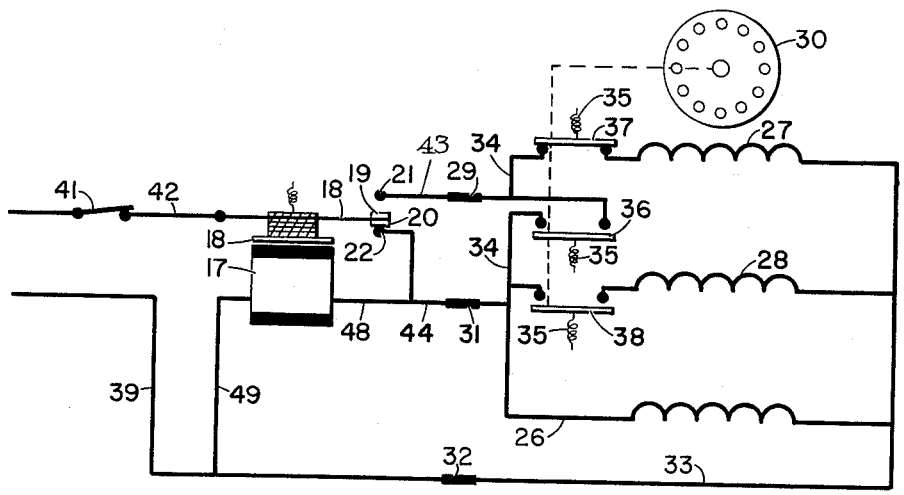
FIG. 5 is a schematic view showing the system of FIG. 4 when the motor is running at high speed.
Figure 6:
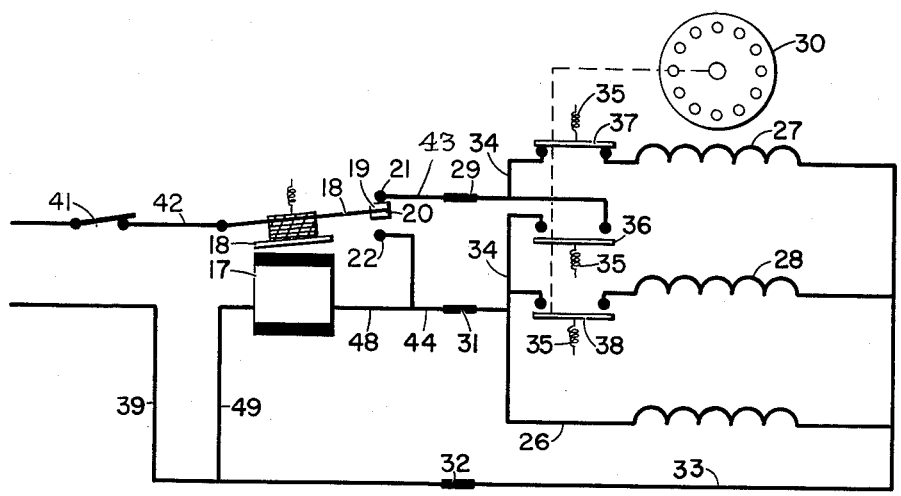
FIG. 6 is a schematic view showing the same system with the motor running at low speed after the line switch has been momentarily disconnected.

The several connections involving the motor and relay and forming a part of the system will be clear by reference now first to FIGS. 4 through 6 inclusive. As there shown, the motor has a high speed winding 26, a low speed winding 27, and a starting winding 28. The motor may be of various types, but in the drawings I indicate schematically a squirrel cage type armature 30. The motor also has the usual low speed terminal 29, high speed terminal 31, and common terminal 32. A conductor 33 runs from the common motor terminal 32 to one end of each of the windings 26, 27 and 28. A second conductor 34 is connected to both the high speed and low speed terminals 31 and 29 and to the opposite ends of the motor windings with a switch 36 disposed between the high speed and low speed windings, and a switch 37 between the low speed winding and the low speed terminal 29. A starting switch 38 is disposed between one end of the starting winding 28 and the common conductor 34. Switches 36 and 38 are normally closed when the motor is at rest, and switch 37 normally open as shown by the biassing spring 35 shown in the drawings. Centrifugal means (not shown) or the like conventionally move the switch arms shown to open switches 36 and 38 and close switch 37 when the motor armature reaches a predetermined speed. In the regular operation of a motor of this type, a line runs from the common terminal 32 to a double pole switch, and also a line from each of the terminals 29 and 31, making three wires between the motor and its regular double throw control switch.

As shown in FIG. 4, a single conductor 39 is connected to the common motor terminal 32, this being the conventional white coded conductor normally grounded and common to the entire system. A single pole, single throw switch 41 is placed in a line 42 leading to the high and low speed terminals 29 and 31 through conductors 43 and 44. A normally closed switch is placed in the conductor 43, and a normally open switch is placed in the conductor 44, these switches being operated by movement of the armature 18, as shown in FIG. 2, the switch in line 43 being closed by engagement of the contact points 19 and 21 (FIG. 2), and the switch in line 44 being closed by the contact points 20 and 22 on energization of the relay coil 17. A conductor 48 leading to the high speed terminal 31, and a conductor 49 leading to the common terminal 32 furnish power for energization of the relay coil 17.

FIGS. 5 and 6 are identical with FIG. 4, except that they show the relative positions of the parts when the motor is running at high speed and low speed respectively. In each of the FIGS. 4, 5, and 6, a simplified schematic illustration is used, so that the operation of the parts and the functioning of the system may be clearly understood. It may be pointed out at this time, by way of further explaining the simplicity of the system, that normally the conductors 43 and 44 would merely continue on with the conductor 39, making a three-wire set of leads, to a regular two pole, double throw switch for energizing either the high or low speed windings of the motor to thereby control its running speed. It is by means of the relay 16, and the interposition of the relay controlled switches in the lines 43 and 44, that the system of the present invention can be operated with a single pole, off and on switch.

In the operation of the motor and system of the present vention, FIG. 4 represents the position of the parts before closing of the line switch 41 which delivers power to the motor. At this time, the motor starting switch 38 is closed, as is also the switch 36 interconnecting the high speed and low speed terminals through the conductor 34. The regular motor switch 37 controlling the low speed winding 27 is also open under these conditions. The relay switch in line 43 is closed and the relay switch 47 open, the relay coil 17 being de-energized at this time.

When the line switch 41 is first closed, a circuit is established through the conductor 42, the relay switch in line 43, motor switch 36, starting switch 38, starting winding 28, high speed winding 26, common conductor 33, and common terminal 32. The motor, therefore, immediately starts to operate by energization of the starting winding 28 and the high speed winding 26. As soon as the switch 41 is closed, the relay coil 17 is also energized through a circuit including conductor 42, the relay switch in line 43, terminal 29, switch 36, terminal 31, conductor 48, and conductor 49. Immediately upon energization of the relay coil 17, however, the armature 18 (FIGS. 2 and 3) is pulled downwardly, breaking the contact between contact points 19 and 21, and establishing contact between contact points 20 and 22. Looking at the schematic drawings comprising FIGS. 4 through 6, this means that the switch in line 43 is open and switch in line 44 closed. The relay coil 17, however, continues to be energized, because a circuit is now established including the conductor 42, contact points 20 and 22, conductor 44, and conductors 48 and 49. Power continues to be supplied to the starting winding 28 and the high speed winding 26, however, through the contact points 20 and 22 and the high speed terminal 31.

As soon as the motor has reached a predetermined speed, determined by its design, the switches 36 and 38, commonly operated by centrifugal action, are opened, and switch 37 closed against the biassing action of springs 35. A circuit as shown in FIG. 5 is thereby established. By examination of such circuit, it will be noted that even though the switch 37 is closed, the low speed winding 27 will not be energized, because the switch 36, between the high speed winding 26 and the low speed winding 27, is now open. Current is delivered to the high speed winding 26 through conductor 42, the relay control switch comprising contacts 20 and 22 and the high speed terminal 31. Under these circumstances, the motor will continue to operate at its maximum or high speed.

To convert the motor to low speed operation, all that is necessary is momentarily to open the line switch 41. This momentary de-energization of the entire motor circuit will, of course, cause the relay coil 17 to become de-energized, thereby permitting the armature 18 to move to the position shown in FIG. 2, opening the relay switch comprising contact parts 20 and 22 and closing the relay switch comprising contact parts 19 and 21. By only momentarily opening the switch 41, however, the motor will still be operating at a relatively high speed when the circuit is again established, and the motor switches 36 and 38 will still be open, and the low speed winding switch 37 will still be closed. A motor circuit is therefore established through the relay switch in line 43, low speed terminal 29, low speed winding 27, back to the common terminal 32, and continued operation at low speed will now result. Since the switch 36 is open, there will be no delivery of power to the high speed winding; nor can power be delivered to the relay coil 17, because of the open condition of switch 36; so that the relay coil 17 remains de-energized, and a static circuit condition will be maintained in which continued operation of the motor will be at low speed.

Using the particular circuit arrangement shown in FIGS. 4 through 6, high speed operation of the motor can again be established by merely throwing the line switch to off, or open, position and allowing enough time, say 10 to 20 seconds, or less, depending on the motor load, for the motor speed to decrease sufficiently to establish the general relationship of the parts shown in FIG. 4. If now the line switch 41 is again closed, operation will be at high speed.

Figure 7:
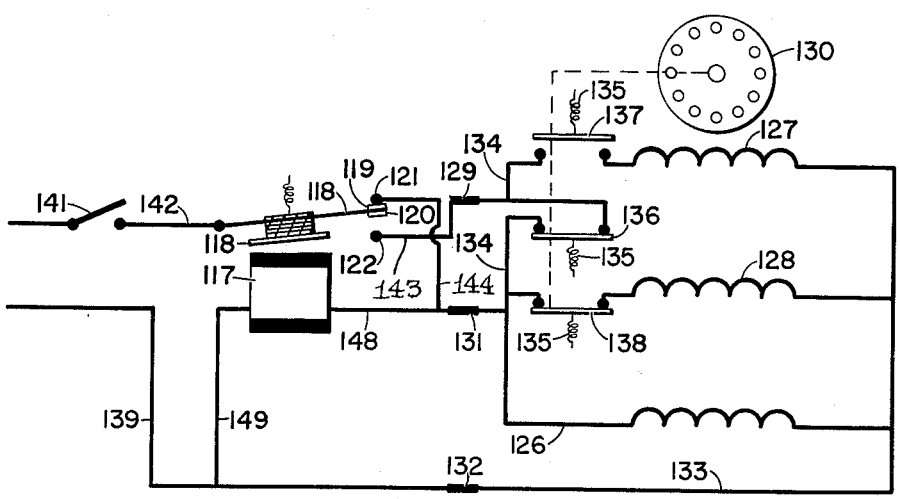
FIG. 7 is a schematic view showing the arrangement of the system when the initial start and running of the motor is at high speed.

In FIG. 7, I show a modification, in which the motor will operate at low speed when it is first connected to power, and in which momentary opening of the line switch will cause the motor to operate at high speed. In FIG. 7, for convenience of illustration, I have employed the same reference characters used in FIGS. 4 through 6, but with the prefix 1 applied to indicate modification. The arrangement of FIG. 7 is the same as that shown in FIG. 4, with the exception that the positions of the normally closed and normally open relay switches are reversed, and the conductor 148 runs to conductor 143. The relay is therefore connected to the common grounded conductor 139, and to the side of the normally open relay switch connected to the motor terminal. In FIG. 4, the connection is between the normally open relay switch and the high speed motor terminal; while in FIG. 7, the connection is between the normally open relay switch and the low speed motor contact terminal.

In FIG. 7, the parts are in the normal positions which they had before starting, with the starting switch 138 closed, the low speed winding switch 137 open, and switch 136 between high speed and low speed windings also closed. In this arrangement, the normally closed relay switch is placed in the line 144, and the normally open relay switch is placed in the line 143. When the line switch 141 is closed, the starting windings 128 and high speed windings 126 are energized by current delivered through the normally closed relay switch. Immediately on closing the line switch 141, however, the relay coil 117 is energized, the circuit through this relay coil running from conductor 142 through the normally closed relay switch, high speed terminal 131, motor switch 136, low speed terminal 129, conductor 148, and conductor 149. Immediately upon energization of the relay coil 117, the normally closed relay switch is opened and the normally open relay switch closed. The circuit including the relay coil 117 now includes conductor 142, conductor 143, conductor 148, and conductor 149. The motor circuit on starting will include the starting coil 128 and high speed coil 126; but when the motor comes up to speed, switches 136 and 138 are opened and switch 137 closed. Continued running of the motor will then be at low speed. If now line switch 141 is momentarily opened, the coil 117 will be de-energized, contacts 120 and 122 will be closed, and contacts 119 and 121 again opened. Thereafter, the motor will continue to run at high speed, a circuit being established to the motor from conductor 142 through relay contacts 120 and 122, conductor 144, high speed terminal 131, high speed motor coil 126, conductor 133, and the common terminal 132. When this circuit is established, there is no longer any flow of current to the relay coil 117, and the motor will continue to operate at high speed until the line switch 141 is again opened.

Whether the motor is operated in accordance with the system in FIGS. 4 through 6, or in accordance with the system shown in FIG. 7, the mechanical association of parts may be identical with that shown in FIGS. 1 through 3, except, of course, for appropriate changes in connections through the relay assembly 16. It should be apparent to those skilled in the art that the relay assembly 16 may be placed at a considerable distance away from the motor, if particular installation conditions indicate that this should be done. More appropriately, however, the relay assembly should be associated with the motor housing, either in the form of a separate but associated appurtenance as shown in the drawings, or as an integral part of the motor itself, in the same manner that switches 136, 137 and 138 are a part of the motor and are normally enclosed within the regular motor housing.

In each of the two embodiments of the invention shown in FIGS. 4 through 6 and FIG. 7, respectively, the basic circuitry involved is relatively uncomplicated. The low speed and high speed motor terminals 29 and 31, respectively, are connected to relay controlled switches, one of which is normally closed, and the other of which is normally open, and thence through a common conductor to a regular single pole line switch. In each instance, also, the solenoid or relay coil is first energized through a circuit including the normally closed relay switch and the motor switch between the low speed and high speed motor windings. On energization of the solenoid or relay coil, however, a solenoid circuit is established which includes the normally open relay switch 75 (closed when the relay coil is energized), but by-passes the switch between the low speed and high speed windings. The relay coil, therefore, continues to be energized even after the motor has come up to speed and the switch between the high speed and low speed windings is opened. When the regular line switch is momentarily opened, however, the relay coil is de-energized, and the normally closed relay switch will, of course, again become closed. At this point, the relay coil cannot again become energized as long as the motor is operating at near its maximum speed at either the high or low winding adjustment; because the switch between the high and low speed windings now being open, the initial coil energizing circuit cannot again be established. Only after the motor speed has been reduced substantially can the relay coil again be energized. While I have found this specific arrangement to be in the simplest, I do not necessarily limit myself to this specific circuitry.

I have referred hereinabove to single phase, fractional horsepower motors with high and low speed running windings and a separate starting winding. Such motors are commonly less than 1 horsepower, but may run somewhat over 1 horsepower. When I refer to fractional horsepower motors, therefore, the term is used in a descriptive sense rather than in a limited sense. The invention has been shown and described in detail, so that those skilled in the art may understand the manner of practicing the same, but the scope of the invention is defined by the claims.

I claim:

1. A system for operating a single phase, two speed motor with high and low speed windings, each with its terminal, and a normally closed speed-responsive switch between said windings by means of a single pole line switch including, in addition to the motor, a relay having a coil and responsive armature actuating a pair of switches, one of which is normally closed and the other of which is normally open, a connection between one of said switches and one of the terminals of the motor, a connection between the second switch and a second terminal of the motor, a common conductor running from the two relay switches to the line switch, and a relay coil circuit including said two relay switches, said two terminals, and the usual switch between the high speed and low speed motor windings normally closed when the motor is at rest, a circuit being established such that when the line switch is closed, the flow of current to the relay coil is through the normally closed relay switch and the motor switch between the low speed and high speed windings, and on energization of the coil directly through the normally open relay switch, so that on initial starting of the motor the relay coil will be maintained in energized condition and hold the circuit initially established through the normally open relay switch, and when the line switch is momentarily disconnected, the circuit to the relay coil is broken and the circuit to the motor will then be through the normally closed relay switch.

2. A single phase, two speed motor adapted to low speed controlled by means of a single pole line switch, said motor comprising a low speed winding, a high speed winding and a starting winding, a common terminal adapted for connection to a power line, a common conductor between said common terminal and one side of each of said windings, a low speed terminal, a high speed terminal, a conductor running from the low speed terminal to said low speed winding, a normally open speed-responsive switch between the low speed terminal and low speed winding, a conductor interconnecting said high speed and low speed terminals, a normally closed speed-responsive switch in said conductor between said terminals, a connection from the starting winding to said terminals through said conductor, a normally closed starting switch in the said circuit including said starting coil, a relay having a normally closed switch connected to said low speed terminal and a normally open switch connected to said high speed terminal, a relay coil having one of its leads connected to the common motor terminal and one of its leads connected to the high speed terminal, and a common connection to both the relay switches for connection to one pole of said line switch.

3. A single phase, two speed motor adapted to low speed controlled by means of a single pole line switch, said motor comprising a low speed winding, a high speed winding and a starting winding, a common terminal adapted for connection to a power line, a common conductor between said common terminal and one side of each of said windings, a low speed terminal, a high speed terminal, a conductor running from the low speed terminal to said low speed winding, a normally open speed-responsive switch between the low speed terminal and low speed winding, a conductor interconnecting said high speed and low speed terminals, a normally closed speed-responsive switch in said conductor between said terminals, a connection from the starting winding to said terminals through said conductor, a normally closed starting switch in the said circuit including said starting coil, a relay having a normally closed switch connected to one of said uncommon terminals, and a normally open switch connected to the second of the two uncommon terminals, a relay coil having one of its leads connected to the common terminal and one of its leads connected to the terminal associated with the normally open relay switch, and a common connection to both the relay switches attached for connection to one pole of said line switch.

4. In a system of the character described, a single phase, two speed motor having a high speed running winding, a high speed terminal connected to one end of said high speed winding, a low speed running winding, a low speed terminal, a speed-responsive switch between the low speed terminal and low speed winding and connecting said terminal and winding during any interval the motor is at operating speed, a starting winding, a normally open speed-responsive start up switch connected to the starting winding and both the high and low speed terminals, said start up switch being closed during any interval when the motor is below operating speed, a normally closed speed-responsive switch between the high and low speed terminals, said switch being closed during any interval when the motor is below operating speed, a common terminal connected to opposite ends of said low speed, high speed and starting windings, a double throw relay having an armature and line voltage relay coil with two leads, said armature normally spring actuated away from said coil, a pair of contacts at the free end of the armature, said armature normally engaging one of said contacts to form normally closed and normally open switching means, one of said switch means connected to the low speed terminal and the other to the high speed terminal, a common connection to the armature for connection into the power line containing a single pole, single throw switch, one terminal of said relay coil connected to said common terminal and the other to the terminal to which the normally open relay switch is connected.

5. In a system for operating a two speed, single phase motor from a single pole line switch, a closed circuit within the motor energized in response to closing of the line switch to drive said motor at a pre-determined speed, means operable in response to closing of said line switch for holding said first-mentioned motor circuit, and means responsive to opening and closing of said line switch to render said holding means ineffective and establish a motor circuit causing said motor to be driven at a speed different from the starting speed.

6. A system for operating a single phase, two speed motor with high speed and low speed running windings by means of a single pole line switch, comprising:
   (a) a relay assembly having a coil, an armature, a normally closed armature-controlled switch and a normally open armature-controlled switch,
   (b) a normally closed speed-responsive switch forming a part of the motor,
   (c) a first circuit including,
      (1) a supply line providing a source of power,
      (2) a line switch,
      (3) said armature,
      (4) said normally closed armature-controlled switch,
      (5) said speed-responsive motor switch, and
      (6) one of said running windings,
   (d) said motor switch and running windings being in series relation in the said circuit,
   (e) a second circuit including,
      (1) said power line,
      (2) said line switch,
      (3) said armature,
      (4) said normally open armature-controlled switch,
      (5) said coil,
      (6) a connection from the coil side of the normally open contact to the winding side of the speed responsive switch,
   (f) a third circuit including,
      (1) said line,
      (2) said line switch,
      (3) the normally closed armature-controlled switch, and
      (4) another of the said running windings of the motor,
   (g) said second circuit functioning to close said first circuit by energization of said coil and to close said third circuit by de-energization of said coil forming a part thereof, so that momentary opening of said switch will establish said first circuit by de-energization of said coil and actuation of said armature-controlled switch.

7. A system for operating a single phase, two speed motor with a starting winding, high speed and low speed windings, by means of a single pole line switch including, in addition to said motor,
   (a) a relay system including,
      (1) a relay coil,
      (2) an armature having a contact for engaging a first contact when said coil is de-energized and for engaging a second contact when said coil is energized,
   (b) a first circuit including the following series-connected elements,
      (1) a first side of a power line,
      (2) said armature contact,
      (3) said first contact,
      (4) a first speed-responsive motor switch closed when said motor is rotating below a predetermined speed,
      (5) said high speed winding,
      (6) a second side of the power line,
   (c) a second circuit including the following series-connected elements,
      (1) said first side of a power line,
      (2) said single pole line switch,
      (3) said armature contact,
      (4) said first contact,
      (5) said first speed-responsive motor switch,
      (6) a second speed-responsive motor switch closed when said motor is rotating below a predetermined speed,
      (7) said single pole line switch,
      (8) said starting winding,
      (9) said second side of the power line,
   (d) a third circuit including the following elements connected in series,
      (1) said first side of a power line,
      (2) said armature contact,
      (3) said first contact, (4) a third speed-responsive motor switch open when said motor is rotating below said predetermined speed,
(5) said low speed winding,
(6) said second side of a power line,
(e) means connecting one side of said relay coil to said second side of a power line,
(f) means connecting the other side of said relay coil to the junction of said first and second speed-responsive motor switches, and
(g) means connecting said other side of said relay coil to said second contact.

References Cited in the file of this patent
UNITED STATES PATENTS

| | | |
|---|---|---|
| 2,277,578 | Booth | Mar. 24, 1942 |
| 2,689,933 | Veinott | Sept. 21, 1954 |